United States Patent Office 2,909,447
Patented Oct. 20, 1959

2,909,447

PROCESS OF TREATING TEXTILE YARNS

Milton J. Scott, Lexington, Mass., assignor to Monsanto Chemical Company, St. Louis, Mo., a corporation of Delaware No Drawing. Original application February 8, 1952, Serial No. 270,756, now Patent No. 2,806,020, dated September 10, 1957. Divided and this application January 13, 1956, Serial No. 558,856

15 Claims. (Cl. 117—139.5)

The present invention relates to novel polymeric materials and processes of preparing such materials. The present invention also relates to processes of sizing textile yarns with such materials to prepare the yarns for weaving. The present invention also relates to the yarns so produced.

It has been proposed in U.S. Patent No. 2,263,598 to prepare high molecular weight copolymers of vinyl acetate and crotonic acid by mass polymerization. In this patent it is stated that the copolymers have a higher softening point and more resistance to water than polyvinyl acetate per se. The copolymers described in this patent have properties which make them desirable for certain uses, but it has been found that when alkali metal salts of such copolymers which contain very high percentages of vinyl acetate are prepared, and heated at elevated temperatures, for example, 300° F., for relatively short periods of time, such salts are difficult to dissolve in water in contrast to the initial alkali metal salts of the copolymers. This latter property of the alkali metal salts of the copolymers of U.S. Patent No. 2,263,598 makes them unsuitable for certain uses where ready solubility or dispersibility in water after a heat treatment is essential. In accordance with the present invention there is provided novel polymeric materials which dissolve readily in aqueous solutions of caustic soda or sodium carbonate for ready application, and which may be dried at elevated temperatures without losing their ability to redissolve or redisperse in water. The properties of the polymeric materials of the present invention make the polymeric materials especially suitable for sizing textile warp yarns since they are readily applied, have good adhesion and may be dried at elevated temperatures without rendering them resistant to removal from the yarn, after a weaving operation, by simple scouring with warm water.

It is, accordingly, one object of this invention to provide novel polymeric materials, and particularly novel polymeric materials which are especially useful in the sizing of textile warp yarns and which are readily removed from such yarns, after having been heated at elevated temperatures, by simple scouring with warm water.

It is a further object of this invention to provide improved compositions for sizing textile warp yarns, especially cellulosic warp yarns.

It is a further object of this invention to provide processes for preparing the novel polymeric materials and compositions referred to in the foregoing objects.

It is a further object of this invention to provide an improved process of sizing textile warp yarns, especially cellulosic warp yarns, to prepare them for weaving.

It is a further object of this invention to provide sized textile warp yarns, especially sized cellulosic warp yarns, which are covered with a tough, adherent and flexible sizing agent which protects the yarns from mechanical damage during weaving and is readily removed from the yarns by a simple scouring in warm water.

Still further objects and advantages of this invention will become apparent from the following description and the appended claims.

It has presently been found that by preparing a low molecular weight copolymer of from about 90 to 98 mol percent of vinyl acetate and from about 10 to 2 mol percent of an unsaturated organic carboxylic compound containing from 3 to 9 carbon atoms and having at least one carboxyl group as, for example, a compound such as crotonic acid, the copolymer has especially valuable properties when it is employed in the form of its alkali metal salts in the sizing of textile warp yarns with the exception of linear synthetic polyamide yarns such as nylon yarns. By "low molecular weight copolymer" is meant a copolymer having a molecular weight such that a molar solution of the copolymer in 2B alcohol (99½% ethanol, ½% benzene) has a viscosity below 18 centipoises but not below 7 centipoises at 20° C. If the copolymer has a molecular weight such that a molar solution thereof in 99.5% ethanol and 0.5% benzene has a viscosity appreciably above 18 centipoises at 20° C., the alkali metal salts of such copolymer lose their water solubility on prolonged heating at temperatures of 200° F. and higher and this makes such copolymer and its alkali metal salts unsuitable for certain uses, especially for sizing textile warp yarns as will become more fully apparent in the following description. Hence, the copolymers of this invention and their alkali metal salts exhibit unusual properties as compared to higher molecular copolymers which properties could not be predicted from the properties of the high molecular weight products.

The term "molar solution of the copolymer" as used above and in the following description and appended claims is intended to mean a formula weight in grams of the monomers in the copolymer in 1 liter of solution. The formula weight in grams is determined by multiplying the gram molecular weight of each monomer in the copolymer by the mol percent of the monomer in the copolymer and adding the resulting figures. Thus, the formula weight in grams of a copolymer of 98 mol percent vinyl acetate and 2 mol percent crotonic acid is equal to the gram molecular weight of vinyl acetate (86 grams) multiplied by 0.98 (mol percent) plus the gram molecular weight of crotonic acid (86 grams) multiplied by 0.02 (mol percent), or 86 grams.

The mol ratio of vinyl acetate to unsaturated organic carboxylic compound in the copolymer is critical when the copolymer is to be used for sizing textile warp yarns. Thus, if the copolymer contains more than 10 mol percent of the unsaturated organic carboxylic compound such as crotonic acid, its alkali metal salts are too sensitive to the high relative humidities used in weaving sized yarns, and do not have the proper hardness and body under such conditions to be useful as a sizing material. On the other hand, if the copolymer contains less than 2 mol percent of the unsaturated organic carboxylic compound such as crotonic acid, its alkali metal salts are not soluble in aqueous solutions of caustic soda or sodium carbonate and it is not possible to use such salts for sizing textile warp yarns.

The copolymers of this invention may be prepared from vinyl acetate and a large variety of unsaturated organic carboxylic compounds containing from 3 to 9 carbon atoms and having at least one carboxyl group. As examples of such unsaturated organic carboxylic compounds may be mentioned the ethylenically unsaturated aliphatic monocarboxylic acids such as alkenic monocarboxylic acids having from 3 to 6 carbon atoms as, for example, acrylic acid, butenic acids such as crotonic acid, isocrotonic acid, methacrylic acid and vinylacetic acid and pentenic acids such as tiglic and angelic acids. In general, the ethylenically unsaturated aliphatic monocarboxylic acids of the general formula, $C_nH_{2n-2}O_2$, where n is a whole number from 3 to 6, and which are polymerizable with vinyl acetate, are useful in preparing the copolymers of this invention. Of the above group of acids crotonic acid is preferred because it is available commercially and copolymerizes with vinyl acetate to give superior copolymers for use in sizing textile warp yarns.

As further examples of unsaturated organic carboxylic compounds containing from 3 to 9 carbon atoms and having at least one carboxyl group may be mentioned the ethylenically unsaturated organic polybasic carboxylic acids which are polymerizable with vinyl acetate such as the relatively water-insoluble ethylenically unsaturated aliphatic dicarboxylic acids of which fumaric and itaconic acids are examples. Of these acids fumaric acid is preferred because it is available commercially.

As further examples of unsaturated organic carboxylic compounds containing from 3 to 9 carbon atoms and having at least one carboxyl group may be mentioned the partial esters of ethylenically unsaturated aliphatic dicarboxylic acids polymerizable with vinyl acetate, and preferably the alkyl half esters of such acids. As examples of such partial esters may be mentioned the alkyl half esters of maleic acid, in which the alkyl group contains from 1 to 4 carbon atoms, such as methyl ethyl and propyl acid maleate; the alkyl half esters of fumaric acid, in which the alkyl group contains from 1 to 4 carbon atoms such as methyl acid fumarate and secondary butyl acid fumarate; the alkyl half esters of citraconic acid, in which the alkyl group contains from 1 to 4 carbon atoms, such as methyl and butyl acid citraconates; alkyl half esters of chlormaleic acid, in which the alkyl group contains from 1 to 4 carbon atoms, such as ethyl and butyl acid chlormaleates; and alkyl half esters of itaconic acid, in which the alkyl group contains from 1 to 4 carbon atoms, such as methyl and butyl acid itaconates, and the like. These esters with the exception of the alkyl acid itaconates are represented generally by the structural formula:

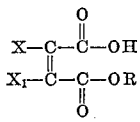

where X is hydrogen, halogen (preferably chlorine) or an alkyl group having at most a number of carbon atoms such that the total number of carbon atoms in the ester does not exceed 9, and where $X_1$ is the same as X or is preferably hydrogen when X is other than hydrogen, and where R is an alkyl group having from 1 to 4 carbon atoms. It is to be understood that the foregoing structural formula for the esters is intended to include the cis- and trans-forms of the esters. Of the above esters the alkyl half esters of maleic acid are preferred because they are readily prepared from commercially available alcohols and commercially available maleic anhydride. Of the half esters of maleic acid, the methyl half ester of maleic acid is preferred for preparing copolymers with vinyl acetate for use in sizing textile warp yarns in accordance with the processes of this invention.

It is to be understood that the low molecular weight copolymers described herein may comprise vinyl acetate and mixtures of the unsaturated acids and esters hereinbefore described as, for example, low molecular weight copolymers of vinyl acetate, crotonic acid and alkyl half esters of maleic acid, in which the alkyl group contains from 1 to 4 carbon atoms, copolymers of vinyl acetate, crotonic acid and acrylic acid and the like.

The preferred copolymers of this invention from the standpoint of proportions of ingredients are the low molecular weight copolymers of 95 to 97 mol percent of vinyl acetate and from 5 to 3 mol percent of the unsaturated organic carboxylic compounds hereinbefore described. The preferred copolymers of this invention from the standpoint of the molecular weight are the copolymers which have a molecular weight such that a molar solution of the copolymer in 99.5% by weight ethanol and 0.5% by weight of benzene has a viscosity between about 7 and 12 centipoises at 20° C. The preferred copolymers of this invention from the standpoint of ingredients employed are the copolymers of vinyl acetate and crotonic acid, the copolymers of vinyl acetate and alkyl half esters of maleic acid, in which the alkyl group contains from 1 to 4 carbon atoms, more preferably the methyl half esters, and the copolymers of vinyl acetate, crotonic acid and alkyl half esters of maleic acid, in which the alkyl group contains from 1 to 4 carbon atoms, more preferably the methyl half ester.

The low molecular weight copolymers of this invention are suitably prepared by adding vinyl acetate monomer and the unsaturated organic carboxylic compound in the proportions desired in the copolymer to an aqueous solution, preferably having a pH of 4 to 7, in the presence of at least 1% by weight, based on the weight of the monomers, of a polymerization catalyst, preferably an oil soluble peroxide catalyst such as benzoyl peroxide and a protective colloid suspending agent such as a water-soluble polyvinyl alcohol, the aqueous solution being at least at the reflux temperature at atmospheric pressure of the mixture obtained by the addition of the monomers to the aqueous solution, and thereafter maintaining the temperature of the mixture at least at the reflux temperature of the mixture at atmospheric pressure until the reflux temperature rises to at least 75° C. The aqueous solution is stirred constantly throughout the foregoing procedure. The polymerization mixture is thereafter cooled and the copolymer, which has been formed, is separated from the aqueous phase by decantation, filtration or centrifugation, preferably by filtration, and then dried.

In carrying out the foregoing process, it is desirable to add from about 1 to 11 parts by weight of the monomers to from about 12 to 9 parts by weight of the aqueous solution. In order to obtain the most efficient production and best yields of the copolymer it is preferred to add from about 4 to 11 parts by weight of the monomers to from about 12 to 9 parts by weight of the aqueous solution. Moreover, it is preferred to mix the vinyl acetate monomer and the unsaturated organic carboxylic compound and to add the resulting mixture to the aqueous solution. It is also desirable to add the monomers to the aqueous solution at a more or less constant rate, preferably at a substantially constant rate. The rate of addition of the monomers may be varied to some extent. However, if the rate of addition of the monomers is too rapid there is a tendency to produce a non-uniform copolymer which is only partly soluble in aqueous solutions of caustic soda at a pH between about 7.5 and 9. If the rate of addition of the monomer is too slow the reaction time is unduly prolonged which leads to the formation of a partial emulsion of the polymer in the aqueous phase and consequent difficulty in separating the copolymer from the aqueous phase. Satisfactory results have been obtained by adding the monomers to the aqueous solution in the presence of the protective colloid suspending agent at the rate of about 10 to 17 parts by weight of the monomers per hour for every 100 parts by weight of the aqueous solution. Best results have been obtained by adding the monomers at the rate of about 10 to 14 parts by weight of the monomers per hour to every 100 parts by weight of the aqueous solution.

The use of a polymerization catalyst is essential and the minimum amount of catalyst used is critical if a low molecular weight copolymer and an efficient reaction rate is to be obtained. It has presently been found necessary to use at least 1% by weight of a polymerization catalyst based on the monomers, in the case of the oil-soluble peroxide type catalysts such as benzoyl peroxide, acetyl peroxide, tertiary-butyl hydroperoxide, cumene hydroperoxide, lauryl peroxide, methyl ethyl ketone peroxide and the like, and in the case of other oil-soluble catalysts such as tertiary butyl perbenzoate, ditertiary-butyl perphthalate and the like. Even larger amounts of water-soluble polymerization catalysts such as hydrogen peroxide and the inorganic per catalysts such as potassium persulfate are required because such catalysts tend to decompose in the aqueous phase of the polymerization mixture. In general, satisfactory results are obtained with from about 1 to 5% by weight of the oil-soluble catalysts, based on the monomers. However, it is preferred to use from about 1.5 to 3.5% by weight of such catalysts based on the monomers. When using the oil-soluble catalysts it is preferred to incorporate them in a mixture of vinyl acetate monomer and the unsaturated organic carboxylic compound. In the case of the water-soluble polymerization catalysts, it is usually desirable to use at least 3% by weight of such catalysts, based on the monomers, and generally up to 10% by weight. Such catalysts are preferably added to the aqueous phase of the polymerization mixture.

The preferred catalysts are the oil-soluble peroxide type, and more preferably benzoyl peroxide.

An essential feature of the polymerization process of this invention is the use of a water-soluble protective colloid suspending agent such as polyvinyl alcohol in order to obtain the copolymer in bead form so that it is readily separated from the aqueous phase of the polymerization mixture. The amounts of such agent used are critical if coagulation of the copolymer or the formation of fine particles which are difficult to recover is to be avoided. The amount of suspending agent will vary to some extent depending on the particular agent used, the rate of stirring of the polymerization mixture and the polymer to water ratio in the polymerization mixture. If the amount of suspending agent used initially is too small coagulation or coalescence of the copolymer beads occurs. This in itself is not objectionable since it has presently been found that the copolymer beads are dispersed if more suspending agent is added. The important factor is that the total amount of suspending agent used should be sufficient to obtain the copolymer in bead form. If the amount of suspending agent employed is too high the copolymer forms as fine particles which are quite difficult to separate from the aqueous phase. In general, it has presently been found necessary to use at least 0.11% by weight of the suspending agent, based on the copolymer, at the lower weight ratios of monomer to aqueous solution, and at least 0.125% by weight of the suspending agent, based on monomers, in the preferred range of about 4 to 11 parts by weight of the monomers to about 12 to 9 parts by weight of the aqueous solution. The maximum amount of suspending agent used should not exceeed about 1.0% by weight of the monomers, and preferably should not exceed about 0.5% by weight of the monomers at any monomer to aqueous solution weight ratio, otherwise the copolymer particles are too fine for efficient recovery. As examples of water-soluble protective colloid suspending agents which may be used in the process of preparing the copolymer may be mentioned water-soluble polyvinyl alcohol, water-soluble copolymers of vinyl acetate and maleic anhydride, gelatin, water-soluble natural gums, gum tragacanth, water-soluble starch, polyacrylic acid, polymethacrylic acid and the like.

Various additives may be used in addition to the catalyst and suspending agent. For example, it is possible to use small amounts of surface active agents, preferably anionic surface active agents such as alkali metal salts of alkyl benzene sulfonic acids, in which the alkyl chain contains at least 10 carbon atoms, alkali metal salts of sulfonated or sulfated fatty alcohols or fatty acids containing at least 10 carbon atoms, alkali metal salts of dialkyl esters of sulfosuccinic acid, in which the alkyl groups contain at least 4 carbon atoms, and the like. Such agents aid in preventing the accumulation of copolymer beads on the walls of the reaction vessel. However, if too much surface active agent is used the copolymer forms as small particles which are difficult to separate from the aqueous phase. Accordingly, it is preferred to use very small amounts of such agents, that is, less than 0.2% by weight, based on the monomers, and more preferably between about 0.001% and 0.1% by weight. It is also possible to use small amounts of modifying agents to control the length of the copolymer chains, for example, agents such as alkyl mercaptans, especially dodecyl mercaptan, carbon tetrachloride and the like.

The temperature used during the polymerization reaction is important, and the polymerization should be carried out at least at the reflux temperature of the mixture at atmospheric pressure. Higher temperatures may be used by carrying out the polymerization at superatmospheric pressures. For example temperatures up to 130° C. may be used. When the polymerization is carried out at atmospheric pressure, that is, at an absolute pressure of about 760 millimeters of mercury, under a reflux condenser, the reflux temperature is initially between about 65 and 70° C. As the polymerization proceeds and substantially all of the vinyl acetate is copolymerized with the unsaturated organic carboxylic compound the reflux temperature increases and the temperature of the polymerization mixture is raised accordingly. In general, when the reflux temperature at atmospheric pressure increases to at least 75° C., the polymerization is substantially complete, although it is preferred to continue the reaction until the reflux temperature at atmospheric pressure is at least 80° C. in order to obtain the optimum yields. The copolymer beads may be separated at this point, after the polymerization mixture is cooled, but it is preferred to pass a current of air over the surface of the polymerization mixture while maintaining the temperature of the mixture until a major portion of the unreacted vinyl acetate monomer has been removed.

After the polymerization mixture is cooled to a suitable temperature, for example, a temperature of about 20 to 50° C., it is preferred to pour the mixture into cold water at a temperature of 30° C. or lower to precipitate the copolymer beads from the mixture. After the copolymer beads have been separated from the mixture, it is preferred to wash the beads with cold water at a temperature below 30° C. to remove impurities. The wet beads may be dried at any temperature, but higher temperatures cause the beads to coalesce and to form a large mass which is difficult to dissolve in aqueous alkali unless the mass is comminuted. It is accordingly preferred to dry the beads at temperatures below 35° C. while stirring the beads, more preferably under a vacuum.

The foregoing process produces beads of the copolymers, which beads are between about 0.15 and 1 millimeter in diameter. Moreover, the process is capable of preparing copolymers having a molecular weight such that a molar solution of the copolymer in 99.5% ethanol and 0.5% benzene has a viscosity below about 18 centipoises but not below 7 centipoises at 20° C.

The present invention is also directed to alkali metal salts of the low molecular weight copolymers hereinbefore described. It has presently been found that the alkali metal salts of the copolymers of this invention are especially suitable for sizing textile warp yarns. Thus, they not only have good adhesion to most textile warp yarns such as cotton, regenerated cellulose and cellulose acetate warp yarns, but they give excellent protection to the warp yarns during weaving and are readily removed from the fabric after weaving by scouring the fabric in warm to hot water. This removal of the alkali metal salts of the copolymers by scouring is also possible even though the alkali metal salts on the yarns or fabrics have been heated to elevated temperatures for prolonged periods of time. This property of the alkali metal salts of the copolymers of this invention distinguishes them from the alkali metal salts of the high molecular weight copolymers of the prior art hereinbefore referred to, since the alkali metal salts of the copolymers of the prior art lose their water-solubility to a marked extent on being heated at elevated temperatures and therefore cannot be removed from warp yarns by simple scouring with warm or hot water within a practical period of time. The preferred alkali metal salt of the copolymers of this invention is the sodium salt. However, potassium, lithium and cesium salts are also useful.

In carrying out the sizing processes of this invention, the size composition which is used in the process is first prepared by dissolving the copolymers of this invention in an aqueous solution containing an amount of an alkali metal hydroxide or an alkaline alkali metal salt such as sodium carbonate, sodium bicarbonate and the like sufficient to cause the copolymers to dissolve and to form the alkali metal salt of the copolymers, or an alkali metal salt of the copolymers may be dissolved in water. The size composition may contain varying amounts of the alkali metal salt of the copolymers depending on the particular yarns to be sized and the construction of the yarns, for example, the amount of twist, etc. In general, satisfactory results are obtained when the size composition contains from about 1 to 10% by weight of the alkali metal salt of the copolymer, but higher concentrations of such salt may be used. The size composition may also comprise suitable sizing adjuncts such as anionic surface active agents to assist in penetration of the size, for example, alkali metal alkyl benzene sulfonates in which the alkyl group contains at least 10 carbon atoms, alkali metal salts of dialkyl sulfo succinates, in which the alkyl groups contain at least 4 carbon atoms, alkali metal salts of sulfates and sulfonates of fatty acids and fatty alcohols containing at least 10 carbon atoms and the like, and textile softeners such as glycerine, diethylene glycol, ethylene glycol, sulfonated tallow and the like. Such adjuncts are normally used in small amounts, for example, from about 0.1 to 5% by weight of the size composition. The size composition may also comprise other alkali soluble sizing materials such as casein, zein, gelatin, starches, polyacrylic acid, polymethacrylic acid, styrene-maleic anhydride interpolymers and the like. However, such sizing agents should only be used in minor amounts, that is, less than 100% by weight based on the alkali metal salts of the copolymers of this invention, and preferably less than 50% by weight based on such salts. The size compositions described above have a pH above 7 and preferably between 7.5 and 9.0.

The size composition may be used at room temperature, but it is preferred to maintain the size composition at a temperature between about 110 and 180° F. during the sizing of textile yarns in order to obtain the most satisfactory penetration of the size composition and the best sizing results.

The sizing composition may be applied to textile yarns by a variety of procedures and using different kinds of equipment. One suitable procedure for carrying out the sizing procedure comprises passing a multitude of textile yarn ends from a creel through a size box, which contains the sizing compositions described above, so that the yarns pass through the sizing composition. After this the yarn ends are passed between squeeze rolls to remove excess solution, and are then passed over a multitude of drying cans, usually 3 to 7 drying cans, of the type normally employed in slashing operations and which are usually maintained at a temperature of about 150 to 230° F. The sized yarns leaving the drying cans usually contain from about 2 to 15% moisture depending on the operating conditions used and the particular apparatus. However, the yarns may contain less moisture at this stage of the sizing operation. The yarns are taken up on a beam or other suitable take up device and are ready for the weaving or knitting operation. By using the foregoing procedure from about 1 to 10% by weight of the alkali metal salt of the copolymer is applied to the yarn, based on the dry yarn weight, depending on the concentration of the sizing composition and the amount of sizing composition picked up by the yarns. Normally a pick-up of from about 25 to 100% by weight of the composition is obtained. The procedure described immediately above is preferred since it provides sized yarns which are more uniformly and more efficiently sized than other procedures.

It is also possible to size textile yarns using other procedures. Thus, the sizing composition may be applied immediately after the textile yarn has been twisted by passing the twisted yarn through the size composition or over rollers coated with the sizing composition. The sized yarn is then dried and packaged or beamed. The sizing composition may also be applied to twisted textile yarns in the form of skeins by dipping the skeins in the sizing composition, removing the skein and drying the skein. Other methods or procedures for applying the sizing composition to textile yarns may also be employed.

Textile yarns sized as described herein are provided with a flexible adherent coating which is sufficiently hard to protect the yarns during weaving or knitting without sticking to the mechanically moving parts of a loom or knitting machine. Moreover, the size coating on the yarn maintains these properties when the yarns are woven or knitted over a wide range of relative humidity conditions, for example, at a relative humidity between about 40 and 80%.

One of the most important advantages of the alkali metal salts of the copolymers of this invention as sizing materials is the fact that they are readily scoured off of the woven or knitted fabric with warm or hot water even after such salts have been heated on the yarn at temperatures of 200 to 300° C. for periods of 15 to 45 minutes and longer. This is an essential feature of a suitable sizing material since such temperatures and prolonged periods of heating are encountered in commercial sizing in those instances where the sizing procedure must be discontinued temporarily due to yarn breaks or because it is necessary to replace the take up or supply device or for other reasons. As is indicated previously herein the alkali metal salts of high molecular weight copolymers of the prior art tend to lose their water-solubility under such conditions and cannot be readily removed from yarns by simple scouring with warm or hot water in a practical period of time, and thus are not suitable for sizing purposes.

A simple test has been devised for ascertaining the suitability of materials as sizes from the standpoint of scourability of such materials from woven or knitted fabrics. In this test a film is prepared from a water solution of the material and a water-soluble dye and the film is dried and then baked for 30 minutes at a temperature of 250° F. The film is then immersed in an excess of water at 40° C. and observed to ascertain the time required for dissolution of the film. This time is easy to determine since the film is visible, until it dissolves completely, because of the presence of the dye. The films of alkali metal salts of the copolymers of this invention dissolve almost instantaneously under the above conditions indicating that they are easily removable from yarns by scouring, whereas films of the alkali metal salts of high molecular weight copolymers of the prior art dissolve very slowly, if at all, indicating that they have unsatisfactory scouring properties. The results of this test have been confirmed in the actual scouring of fabrics containing yarns sized with the alkali metal salts hereinbefore referred to.

A further understanding of the copolymers, processes and sized yarns of this invention will be obtained from the following specific examples which are intended to illustrate this invention, but not to limit the scope thereof, parts and percentages being by weight. The first two examples illustrate the copolymers of this invention and the process of preparing such copolymers. The remaining examples illustrate the sizing processes and sized yarns of this invention.

*Example I*

Six hundred cubic centimeters of water, 0.25 gram of medium viscosity polyvinyl alcohol and 0.5 milliliter of a 5% aqueous solution of the sodium salt of the dioctyl ester of sulfo succinic acid were charged to a glass reaction vessel equipped with a stirrer, a reflux condenser and a dropping funnel. This solution was first heated to 65° C. with vigorous stirring and a monomer mixture consisting of about 194 grams of monomeric vinyl acetate, 6 grams of monomeric crotonic acid and 4 grams of benzoyl peroxide was then added at a substantially constant rate, the rate being adjusted so that substantially all of the monomer mixture was added over a period of 3 hours. During the monomer addition the temperature of the resulting mixture was maintained at the reflux temperature which was about 65° C. and the mixture was continuously stirred. After all of the monomer mixture had been added the temperature of the mixture was maintained at the reflux temperature of the mixture until the reflux temperature rose to 80° C. Air was then sucked over the polymerization mixture to remove unreacted vinyl acetate. The polymerization mixture, which contained beads of a copolymer of vinyl acetate and crotonic acid, was then cooled to 40° C. with stirring and poured into an equal volume of cold water at a temperature of about 20° C. to precipitate the copolymer beads. The polymerization mixture was then filtered through cotton sheeting and the copolymer beads were washed thoroughly with cold water. The wet beads thus obtained were then dried, while stirring the beads, under a vacuum at a temperature of 30° C.

The copolymer obtained according to the foregoing procedure was soluble in an aqueous solution of caustic soda at a pH of about 7.8, and contained about 97 mol percent of combined vinyl acetate and 3 mol percent of combined crotonic acid. This copolymer had a molecular weight such that a molar solution of the copolymer in 99.5% ethanol and 0.5% benzene had a viscosity of about 9.7 centipoises at 20° C. Solutions of alkali metal salts of the copolymer were readily prepared by dissolving 5 parts of the copolymer in 100 parts of water containing sufficient alkali metal hydroxide to provide a solution having a pH of 8.0. Films prepared from such solutions to which had been added a water-soluble blue dye, and dried and then baked for 30 minutes for 250° F. dissolved within a period of about 30 seconds in an excess of water at 40° C.

Films of alkali metal salts of high molecular weight copolymers of vinyl acetate and crotonic acid having a molecular weight such that a molar solution of the copolymer in a solution of 99.5% ethanol and 0.5% benzene had a viscosity of 28 centipoises at 20° C. were prepared in the same manner. Such films did not dissolve in an excess of water at 40° C. within a practical period of time.

*Example II*

Six hundred cubic centimeters of water, 0.25 gram medium viscosity polyvinyl alcohol and 0.5 milliliter of a 5% aqueous solution of the sodium salt of the dioctyl ester of sulfo succinic acid were charged to a glass reaction vessel equipped with a stirrer, a reflux condenser and a dropping funnel. This solution was first heated to a temperature of 65° C. with vigorous stirring and a monomer mixture of 181 grams of vinyl acetate, 14.5 grams of methyl half ester of maleic acid and 4 grams of benzoyl peroxide were then added at a substantially constant rate of about 1.1 grams per minute, which monomer addition required about 3 hours. During the monomer addition the temperature of the water-monomer mixture was maintained at the reflux temperature which was about 67° C. at atmospheric pressure, and the mixture was stirred continuously. After all of the monomer mixture had been added the temperature of the polymerization mixture was maintained at the reflux temperature of the mixture until the reflux temperature rose to 80° C. Thereafter air was sucked over the polymerization mixture to remove unreacted vinyl acetate monomer. The polymerization mixture thus obtained contained beads of a copolymer of vinyl acetate and methyl half ester of maleic acid, and this mixture was then cooled to a temperature of 40° C. with stirring and poured into an equal volume of cold water at a temperature of about 20° C. to precipitate the copolymer beads. The resulting mixture was filtered through cotton sheeting and the beads of the copolymer were then washed thoroughly with cold water and finally air dried while stirring the beads.

The copolymer obtained according to the procedure described immediately above was soluble in an aqueous solution of caustic soda at a pH of about 7.5, and contained about 95 mol percent of combined vinyl acetate and about 5 mol percent of combined methyl acid maleate. This copolymer had a molecular weight such that a molar solution of the copolymer in 99.5% ethanol and 0.5% benzene had a viscosity of about 10.1 centipoises at 20° C. Films prepared from aqueous solutions of a water-soluble blue dye and alkali metal salts of such copolymer and then dried and finally baked for 30 minutes at 250° F. dissolved within a period of about 45 seconds in an excess of water at 40° C.

*Example III*

A solution of the sodium salt of the copolymer of Example II was prepared by adding 8 parts of dry beads of the copolymer to 92 parts of water with stirring and the slow addition of 0.65 part of sodium hydroxide, while maintaining the temperature of the water at 180° F. The solution thus obtained had a pH of 7.8 (glass electrode). This solution was charged to the size box of a slasher and maintained at a temperature of 140° F.

Seventy-five filament, twenty-four denier cellulose acetate yarns having a twist of 2–S turns per inch were drawn through the size solution, as prepared above, at the rate of 10 yards per minute and then passed between squeeze rolls adjusted to give a solution pick-up of 25% based on the dry yarn weight so as to deposit about 2% of copolymer salt based on the dry yarn. The wet yarns were then passed over 5 rotating drying cans arranged in tandem, which cans were maintained at temperatures of 180° F., 200° F., 200° F., 200° F., and 160° F., respectively, to dry the yarns, after which the yarns were taken up on a beam. No foaming of the solution or size accumulation on the drying cans was noted during the sizing procedure.

The weaving efficiency of the sized yarns at a relative humidity of about 60% was excellent. The size was substantially completely removed from the woven fabric by scouring the fabric in warm water.

*Example IV*

Forty filament, one hundred and fifty denier cellulose acetate yarns having a twist of 2.5–S turns per inch were sized using the same solution and procedure described in Example III. The weaving efficiency of the sized yarns was excellent, and the size was substantially completely removed from the yarns by scouring in warm water.

*Example V*

Twenty-two and two-tenths pounds of dry beads of the copolymer prepared according to Example I and three and eight-tenths pounds of sodium bicarbonate were added to 75 gallons of water with vigorous agitation, the water temperature initially being 100° F. The mixture was heated to 180° F. A substantially complete solution of the sodium salt of the copolymer was thus obtained in about 70 minutes. The resulting mixture was then diluted with 100 gallons of cold water, with stirring, and a portion of the diluted solution was charged to the size box of a slasher and maintained at 135° F.

Thirty-seven hundred and thirty-five ends of 150 filament, 40 denier viscose rayon yarn having a twist of two turns per inch were drawn through the size solution at the rate of 55 yards per minute and then padded between squeeze rolls adjusted at a pressure of 10 pounds per linear inch so as to deposit about 2.6% of the copolymer salt, based on the weight of the dry yarns. The wet yarns were then dried by passing them at a rate of 55 yards per minute over 7 rotating drying cans which were arranged in series, the drying cans being maintained at temperatures of 185° F., 190° F., 215° F., 220° F., 205° F., 190° F., and 180° F., respectively, after which they were collected on a beam. No foaming of the size solution and no accumulation of sizing material on the drying cans were noticed during the sizing operation.

The sized warp yarns were woven into a fabric at a relative humidity of 75%. The weaving efficiency was excellent and no accumulation of size was noted on the moving parts of the loom during the weaving operation. The size was readily removed from the warp yarns of the fabric by scouring the fabric in warm water.

*Example VI*

One hundred parts of the copolymer of Example I and twelve parts of sodium bicarbonate were stirred into 2128 parts of hot water until the copolymer dissolved to form a solution of the sodium salt of the copolymer. This solution, which had a pH of about 8.2, was charged to the size box of a slasher and maintained at a temperature of 140° F.

Twenty-four filament, seventy-five denier cellulose acetate yarns having a twist of 2–S turns per inch were drawn through the above solution at a rate of 10 yards per minute and then passed between squeeze rolls which were adjusted to pick up about 35% of the solution, based on the dry yarns, so as to deposit about 2% copolymer salt based on the dry yarns. The yarns were then dried by passing them over 5 rotating dry cans which were maintained at temperatures of 180° F., 200° F., 200° F., 200° F., and 160° F., respectively. No foaming of the size solution and no size accumulation on the dry cans was noted.

The filaments of the sized yarns were well closed and the sized yarns were supple and yet appreciably stiffened. The size coating on the yarns had excellent adhesion and did not crack or dust off on flexing the yarns. The size coating was easily removed from the yarns by simple scouring in warm water.

Examples III through VI illustrate the sizing of regenerated cellulose and cellulose acetate filament yarns, but it is to be understood that the sizing processes of this invention may also be used to size spun yarns, that is, yarns prepared from natural fibers or synthetic staple fibers or mixtures thereof, or from other types of textile yarns. As examples of textile yarns which may be sized by the processes of this invention may be mentioned natural cellulose yarns such as cotton yarns, linen yarns, ramie yarns and the like; natural keratinous yarns such as wool yarns, yarns prepared from mixtures of wool with other animal fibers such as mohair fibers, camel's hair and the like; regenerated cellulose yarns prepared from cuprammonium and viscose spinning solutions; yarns prepared from organic derivatives of cellulose such as cellulose acetate, cellulose propionate and the like; yarns prepared from fiber forming synthetic polymers such as polyacrylonitrile and its copolymers, copolymers of vinyl chloride and vinyl acetate, condensation products of ethylene glycol and terephthalic acid and the like; and yarns prepared from plied textile yarns or mixtures of the foregoing natural fibers and synthetic staple fibers. The sizing processes of this invention are not intended to include the sizing of yarns prepared solely from linear synthetic polyamides of aliphatic dibasic carboxylic acids and aliphatic diamines as, for example, polyamides of adipic acid and hexamethylene diamine. The sizing processes of this invention have been found to be especially suitable for the sizing of regenerater cellulose and cellulose acetate yarns, and the sizing of such yarns is preferred because of the excellent results obtained.

Various modifications may be made in the copolymers processes and sized yarns described herein as will be apparent to those skilled in the art to which this invention appertains without departing from the spirit and intent of this invention. Accordingly, it is to be understood that it is not intended to limit this invention except by the scope of the appended claims.

This is a division of the copending application of Milton J. Scott and Alton E. Peacock, Serial No. 270,756, filed February 8, 1952, now U.S. Patent No. 2,806,020.

What is claimed is:

1. A process of sizing textile yarns to prepare them for weaving or knitting which comprises applying to textile yarns containing fibers selected from the group consisting of cotton fibers, wool fibers, regenerated cellulose fibers, cellulose acetate fibers, fibers of acrylonitrile polymers, fibers of copolymers of vinyl chloride and vinyl acetate and fibers of fiber-forming condensation products of ethylene glycol and terephthalic acid, an aqueous solution having a pH above 7 of an alkali metal salt of a copolymer of 90 to 98 mol percent of vinyl acetate and 10 to 2 mol percent of an ethylenically unsaturated organic carboxylic compound copolymerizable with vinyl acetate and containing from 3 to 9 carbon atoms and having at least one carboxyl group, said copolymer being further characterized in that a molar solution thereof in 99.5% ethanol and 0.5% benzene has a viscosity below 18 centipoises but not below 7 centipoises at 20° C., and thereafter drying said yarns.

2. A process according to claim 1, but further characterized in that the copolymer is a copolymer of vinyl acetate and crotonic acid.

3. A process according to claim 1, but further characterized in that the copolymer is a copolymer of vinyl acetate and an alkyl half ester of maleic acid, in which the alkyl group contains from 1 to 4 carbon atoms.

4. A process according to claim 1, but further characterized in that the solution also contains less than 100% by weight based on the alkali metal salt of the copolymer of an alkali-soluble sizing agent selected from the group consisting of casein, zein, gelatine, starch, polyacrylic acid, polymethacrylic acid and styrene-maleic anhydride interpolymers.

5. A process of sizing regenerated cellulose warp yarns to prepare them for weaving which comprises applying to said yarns an aqueous solution having a pH above 7 of from about 1 to 10% by weight of a sodium salt of a copolymer of 90 to 98 mol percent of vinyl acetate and 10 to 2 mol percent of an ethylenically unsaturated organic carboxylic compound copolymerizable with vinyl acetate containing from 3 to 9 carbon atoms and having at least one carboxyl group, said copolymer being further characterized in that a molar solution thereof in 99.5% ethanol and 0.5% benzene has a viscosity between about 7 and about 12 centipoises at 20° C., said solution being supplied in an amount sufficient to deposit from about 1 to 10% by weight of said salt, based on the dry yarns, and thereafter drying said yarns preparatory to weaving said yarns.

6. A process according to claim 5, but further characterized in that the copolymer is a copolymer of vinyl acetate and crotonic acid.

7. A process according to claim 5, but further characterized in that the copolymer is a copolymer of vinyl acetate and an alkyl half ester of maleic acid, in which the alkyl group contains from 1 to 4 carbon atoms.

8. A process of sizing cellulose acetate warp yarns to prepare them for weaving which comprises applying to said yarns an aqueous solution having a pH between 7.5 and 9 of from about 1 to 10% by weight of a sodium salt of a copolymer of 90 to 98 mol percent of vinyl acetate and 10 to 2 mol percent of an ethylenically unsaturated organic carboxylic compound copolymerizable with vinyl acetate containing from 3 to 9 carbon atoms and having at least one carboxyl group, said copolymer being further characterized in that a molar solution thereof in 99.5% ethanol and 0.5% benzene has a viscosity between about 7 and about 12 centipoises at 20° C., said solution being supplied in an amount sufficient to deposit from about 1 to 10% by weight of said salt based on the dry yarns, and thereafter drying said yarns preparatory to weaving said yarns.

9. A process according to claim 8, but further characterized in that the copolymer is a copolymer of vinyl acetate and crotonic acid.

10. A process according to claim 8, but further characterized in that the copolymer is a copolymer of vinyl acetate and an alkyl half ester of maleic acid, in which the alkyl group contains from 1 to 4 carbon atoms.

11. A process of sizing warp yarns containing fibers of fiber-forming condensation products of ethylene glycol and terephthalic acid to prepare them for weaving which comprises applying to said yarns an aqueous solution having a pH above 7 of from 1 to 10% by weight of a sodium salt of a copolymer of 90 to 98 mol percent of vinyl acetate and 10 to 2 mol percent of crotonic acid, said copolymer being further characterized in that a molar solution thereof in 99.5% ethanol and 0.5% benzene has a viscosity below 18 centipoises but not below 7 centipoises at 20° C., said solution being supplied in an amount sufficient to deposit from about 1 to 10% by weight of said salt, based on the dry yarns, and thereafter drying said yarns preparatory to weaving said yarns.

12. A process of sizing warp yarns containing fibers of fiber-forming condensation products of ethylene glycol and terephthalic acid which comprises applying to said yarns an aqueous solution having a pH above 7 of from about 1 to 10% by weight of a sodium salt of a copolymer of from 90 to 98 mol percent of vinyl acetate and 10 to 2 mol percent of an alkyl half ester of maleic acid, in which the alkyl group contains from 1 to 4 carbon atoms, said copolymer being further characterized in that a molar solution thereof in 99.5% ethanol and 0.5% benzene has a viscosity below 18 centipoises but not below 7 centipoises at 20° C., said solution being supplied in an amount sufficient to deposit from about 1 to 10% by weight of said salt, based on the dry yarns, and thereafter drying said yarns preparatory to weaving said yarns.

13. A textile yarn containing fibers selected from the group consisting of cotton fibers, wool fibers, regenerated cellulose fibers, cellulose acetate fibers, fibers of acrylonitrile polymers, fibers of copolymers of vinyl chloride and vinyl acetate and fibers of fiber-forming condensation products of ethylene glycol and terephthalic acid, sized with an alkali metal salt of a copolymer of 90 to 98 mol percent of vinyl acetate and 10 to 2 mol percent of an ethylenically unsaturated organic carboxylic compound copolymerizable with vinyl acetate and containing from 3 to 9 carbon atoms and having at least one carboxyl group, said copolymer being further characterized in that a molar solution thereof in 99.5% ethanol and 0.5% benzene has a viscosity below 18 centipoises but not below 7 centipoises at 20° C., said salt being further characterized in that an aqueous solution thereof has a pH above 7.

14. A textile yarn containing fibers selected from the group consisting of cotton fibers, wool fibers, regenerated cellulose fibers, cellulose acetate fibers, fibers of acrylonitrile polymers, fibers of copolymers of vinyl chloride and vinyl acetate and fibers of fiber-forming condensation products of ethylene glycol and terephthalic acid, sized with a sodium salt of a copolymer of 90 to 98 mol percent of vinyl acetate and 10 to 2 mol percent of crotonic acid, said copolymer being further characterized in that a molar solution thereof in 99.5% ethanol and 0.5% benzene has a viscosity below 18 centipoises but not below 7 centipoises at 20° C., said sodium salt being further characterized in that an aqueous solution thereof has a pH above 7.

15. A textile yarn containing fibers selected from the group consisting of cotton fibers, wool fibers, regenerated cellulose fibers, cellulose acetate fibers, fibers of acrylonitrile polymers, fibers of copolymers of vinyl chloride and vinyl acetate and fibers of fiber-forming condensation products of ethylene glycol and terephthalic acid, sized with a sodium salt of a copolymer of 90 to 98 mol percent of vinyl acetate and 10 to 2 mol percent of an alkyl half ester of maleic acid, in which the alkyl group contains from 1 to 4 carbon atoms, said copolymer being further characterized in that a molar solution thereof in 99.5% ethanol and 0.5% benzene has a viscosity below 18 centipoises but not below 7 centipoises at 20° C., said sodium salt being further characterized in that an aqueous solution thereof has a pH above 7.

References Cited in the file of this patent
UNITED STATES PATENTS

| | | |
|---|---|---|
| 1,976,679 | Fikentscher et al. | Oct. 9, 1934 |
| 2,263,598 | Starck et al. | Nov. 25, 1941 |
| 2,576,915 | Barrett | Dec. 4, 1951 |
| 2,643,246 | Wilson | June 23, 1953 |
| 2,657,189 | Pinkney | Oct. 27, 1953 |
| 2,686,137 | Rossin et al. | Aug. 10, 1954 |